United States Patent [19]
Park et al.

[11] Patent Number: 5,831,470
[45] Date of Patent: Nov. 3, 1998

[54] HIGH-EFFICIENCY CHARGE PUMPING CIRCUIT

[75] Inventors: Jin Suog Park, Kyungki-do; Tae Hoon Kim, Seoul, both of Rep. of Korea

[73] Assignee: LG Semicon Co., Ltd, Chungcheongbuk-Do, Rep. of Korea

[21] Appl. No.: 697,668

[22] Filed: Aug. 28, 1996

[30]  Foreign Application Priority Data

Nov. 23, 1995 [KR] Rep. of Korea .................. 43303/1995

[51] Int. Cl.$^6$ ........................................................ G05F 1/10
[52] U.S. Cl. ............................ 327/536; 327/537; 327/589
[58] Field of Search ..................................... 327/536, 537, 327/538, 540, 541, 543, 589

[56]  References Cited

U.S. PATENT DOCUMENTS

| | | | |
|---|---|---|---|
| 5,039,325 | 8/1991 | Miller et al. ................................ | 65/3.12 |
| 5,126,590 | 6/1992 | Chern ........................................ | 327/536 |
| 5,253,204 | 10/1993 | Hatakeyama et al. .............. | 365/189.06 |
| 5,267,201 | 11/1993 | Foss et al. ........................... | 365/189.09 |
| 5,337,284 | 8/1994 | Cordoba et al. ......................... | 365/227 |
| 5,367,489 | 11/1994 | Park et al. ................................ | 327/536 |
| 5,412,257 | 5/1995 | Cordoba et al. ......................... | 327/536 |
| 5,511,026 | 4/1996 | Cleveland et al. ................. | 365/189.09 |
| 5,621,348 | 4/1997 | Furutani et al. ......................... | 327/536 |

*Primary Examiner*—Timothy P. Callahan
*Assistant Examiner*—Jung Ho Kim
*Attorney, Agent, or Firm*—Morgan, Lewis & Bockius LLP

[57]  ABSTRACT

A high-efficiency charge pumping circuit includes an oscillator for generating a predetermined cycle of pulse voltage; a first booster capacitor unit for storing an output of the oscillator at a high level, and outputting an output when the output of the oscillator is at a low level; a first clamp unit for maintaining the output of the first booster capacitor unit at a predetermined level; a second clamp unit for maintaining the output of the first booster capacitor unit at a predetermined level; a double-booster circuit for performing a double-boosting of an output signal of the oscillator and then outputting the double-boosted output signal as an output of the double-booster circuit; a second booster capacitor unit for temporarily storing an output voltage of the double-boosted circuit and for outputting the temporarily stored voltage to the second clamp unit; an output transistor for receiving a voltage greater than a predetermined level from the double-booster circuit, and for completely outputting a voltage input from the first clamp unit; a voltage holding transistor for receiving an internal voltage, and for outputting a voltage signal to an output node; a clipper for interrupting a threshold voltage of the output transistor when a voltage of the output transistor is above a predetermined voltage; and a storage capacitor for temporarily storing a voltage of the voltage holding transistor.

11 Claims, 4 Drawing Sheets

HIGH-EFFICIENCY CHARGE PUMPING CIRCUIT

FIELD OF THE INVENTION

The present invention relates to a high-efficiency charge pumping circuit and, more particularly, to a high-efficiency charge pumping circuit which supplies voltages to an N-channel MOSFET (NMOS FET).

DISCUSSION OF THE RELATED ART

A conventional charge pumping circuit will be discussed with reference to the attached drawings.

As illustrated in FIG. 1, a conventional charge pumping circuit includes: an oscillator 10 which generates a predetermined cycle of pulses; first and second clamp units 11 and 12, respectively, for fixing a portion of a waveform output from the oscillator 10 to a predetermined electric potential; first and second booster capacitors 13 and 14 respectively connected in parallel between the clamps 11 and 12 for increasing the electric potential output from the oscillator 10 and for outputting the increased potential; an output transistor 15 having a drain terminal receiving the output 20 of the first booster capacitor 13, and a gate terminal receiving the output signal 21 of the second booster capacitor 14; an overvoltage blocking circuit 16 for outputting a signal which indicates if the output voltage of the output transistor 15 is overvoltage with respect to the oscillator 10; a voltage holding transistor 17 for outputting a received internal voltage Vcc to an output node 19 when the system of the circuit is turned on; and a storage capacitor 18 for storing the voltage of the output transistor 15.

As shown in FIG. 2, the oscillator 10 includes: a PMOS transistor 10a having a gate terminal connected to a power source Vss, and a source terminal connected to the power source Vcc, thereby outputting the power source Vcc to the drain terminal of the transistor when power is turned on; an inverter 10b for inverting and outputting the signal of the PMOS transistor 10a; an inverter unit 10n which inverts the output signal of the oscillator 10 through nine inverters 10e to 10m which are sequentially connected in series, and for outputting the inverted signal therefrom; a first NAND gate 10c which performs a NAND logic function with a signal from the overvoltage blocking circuit 16 and a signal from the inverter unit 10n, and which outputs the NANDed signal; and a second NAND gate 10d which performs a NAND logic function with a signal from the first NAND gate 10c and the inverter 10b.

The first and second clamp units 11 and 12 include: NMOS transistors 11a and 12a turned on/off by receiving an output of the oscillator 10 which is inverted by inverters 22a and 22b, and having gate terminals connected to a power source Vcc; PMOS transistors 11c and 12c turned on/off by receiving the outputs of the NMOS transistors 11a and 12a and the output of the oscillator 10 inverted by the inverter 22c which is applied to the gate terminals of the PMOS transistors; and PMOS transistors 11b and 12b turned on/off when the outputs of the NMOS transistors 11a and 12a are input to the gate terminals of the NMOS transistors, and having source terminals connected to the power source Vcc.

The overvoltage blocking circuit 16 includes: PMOS and NMOS transistors 16a and 16b having gate terminals connected in common to a power source Vcc, and turned on/off by receiving the output of the output transistor 15; a PMOS transistor 16c having a gate terminal receiving the output of the connection point of PMOS transistor 16a and NMOS transistor 16b, and turned on/off by the Vcc power source; an NMOS transistor 16d having a gate terminal coupled to power source Vcc and a grounded source terminal, and turned on/off by receiving the output of the PMOS transistor 16c; a first inverter 16f which inverts the output of the PMOS transistor 16c and which outputs the inverted signal; an NMOS transistor 16e having a gate terminal receiving the output of the first inverter 16f and a grounded source terminal, and turned on/off by receiving the output of the PMOS transistor 16c; and a second inverter 16g which inverts the output of the first inverter 16f and which then outputs the inverted signal.

The voltage inverted from the inverter 22c is inverted again in the inverter 22d, and temporarily stored in the booster capacitors 13 and 14. The output of the booster capacitor 13 is input to the output transistor 15 together with the voltage output from the first clamp unit 11.

The output of the booster capacitor 14 is input to the gate terminal of the output transistor 15 together with the voltage output from the second clamp unit 12.

The operation of the conventional charge pumping circuit will be described as follows.

When the voltage signal Vcc is applied to the voltage holding transistor 17, a predetermined voltage (Vcc−Vth) subtracted by a threshold from the transistor 17 is applied to the output node 19.

Once the Vcc voltage is completely applied, the node voltage of the output node 19 is lowered below the voltage of Vcc, so that the overvoltage blocking circuit 16 operates the first oscillator 10 and thereby generates a predetermined cycle of pulses.

The output 22 of the oscillator 10 at a low lever is input through the inverters 22a and 22b to the NMOS transistors 11a and 12a in the first and second clamp unit 11 and 12. Then, the NMOS transistors 11a and 12a output a LOW signal, and apply it to the gate terminals of PMOS transistors 11b and 12b, and to the PMOS transistors 11c and 12c.

The LOW signal output from the inverters 22a and 22b is re-inverted into a HIGH signal in the inverter 22c, and applied to the gate terminals of the PMOS transistors 11c and 12c. Accordingly, the PMOS transistors 11c and 12c are turned off, and the PMOS transistors 11b and 12b are turned on to provide an output corresponding to the power source Vcc.

That is, if the output 22 of the oscillator 10 is a LOW level, the first and second clamp units 11 and 12 are turned on and therefore stop the drain and gate voltages of the output transistor 15 from being lowered below the Vcc voltage.

When the output 22 of the oscillator 10 is HIGH, the signal is applied through the inverters 22a and 22b to the first and second clamp units 11 and 12 to be input to the NMOS transistors 11a and 12a. Then, the NMOS transistors 11a and 12a output the HIGH signals and input them to the gate terminals of the PMOS transistors 11b and 12b and to the PMOS transistors 11c and 12c.

The HIGH signal output from the inverters 22a and 22b is inverted into a LOW signal in the inverter 22c, and thereafter the inverted signal is input to the gate terminals of the PMOS transistors 11c and 12c.

Accordingly, the PMOS transistors 11c and 12c are turned on, and the PMOS transistors 11b and 12b are turned off, so that the drain and gate voltages of the output transistor 15 are 2 Vcc. Namely, when the output transistor 15 is turned on, the voltage is supplied to the storage capacitor 18.

If the voltage of the output node 19 equals Vcc plus the threshold voltage of the output transistor (Vcc+Cell Vth) by the operation of the oscillator 10, the overvoltage blocking circuit 16 is turned on, and therefore stops the operation of the oscillator 10 and the voltage from being supplied to the storage capacitor 18.

During the voltage pumping operation, the drain and gate voltages of the output transistor 15 can be increased to 2 Vcc, and the maximum voltage supplied to the output node 19 is 2 Vcc–Vth.

As illustrated in FIG. 3, however, if the voltage level of the output voltage Vpp is in a worst condition of Vcc, namely, 2.7 V which is lower than that of the output transistor, the voltage does not reach the required level (Vcc+Cell Vth) of the output node 19. Moreover, as the maximum voltage to be supplied to the storage capacitor 18 is 2 Vcc–Vth, the consumed charge is too much for the pumping efficiency, thereby decreasing its efficiency.

SUMMARY OF THE INVENTION

Accordingly, the present invention is directed to a high-efficiency charge pumping circuit that substantially obviates one or more of the problems due to limitations and disadvantages of the related art.

An object of the present invention is to provide a high-efficiency charge pumping circuit for increasing a gate voltage of the output transistor above its threshold voltage (2 Vcc+Vth) by use of a double-booster circuit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the high-efficiency charge pumping circuit of the invention includes: an oscillator for generating a predetermined cycle of pulse voltage; a first booster capacitor unit for storing an output of the oscillator and a high level, and outputting the stored output when the output of the oscillator is at a low level; a first clamp unit for maintaining the output of the first booster capacitor unit at a predetermined level; a second clamp unit for maintaining the output of the first booster capacitor unit at a predetermined level; an double-booster circuit for performing a double-boosting of an output signal of the oscillator and then outputting the double-boosted output signal as an output of the double-booster circuit; a second booster capacitor unit for temporarily storing an output voltage of the double-booster circuit, and then outputting the temporarily stored voltage to the second clamp unit; an output transistor for receiving a voltage greater than a predetermined level from the double-booster circuit, and for completely outputting a voltage input from the first clamp unit; a voltage holding transistor for receiving an internal voltage, and for outputting a voltage signal to an output node; a clipper for interrupting a threshold voltage of the output transistor when a voltage of the output transistor is above a predetermined voltage; and a storage capacitor for temporarily storing a voltage of the voltage holding transistor.

In another aspect, a high-efficiency charge pumping circuit includes: an oscillator for generating an output comprising a predetermined cycle of pulses; a double-booster circuit for at least double-boosting the output of the oscillator in order to provide an output that has at least been double-boosted; an output transistor for receiving a voltage greater than a predetermined level and based on the output of the double-booster circuit such that the output transistor completely outputs a voltage received by the output transistor; and a storage capacitor, coupled to the output transistor, for temporarily storing a voltage to be output from the charge pumping circuit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION OF PREFERRED EMBODIMENT

Reference will now be made in detail to the preferred embodiments of the present invention, examples of which are illustrated in the accompanying drawings. Specifically, a high-efficiency charge pumping circuit of the invention will be described below in detail with reference to FIGS. 4 and 5.

Figure 1:
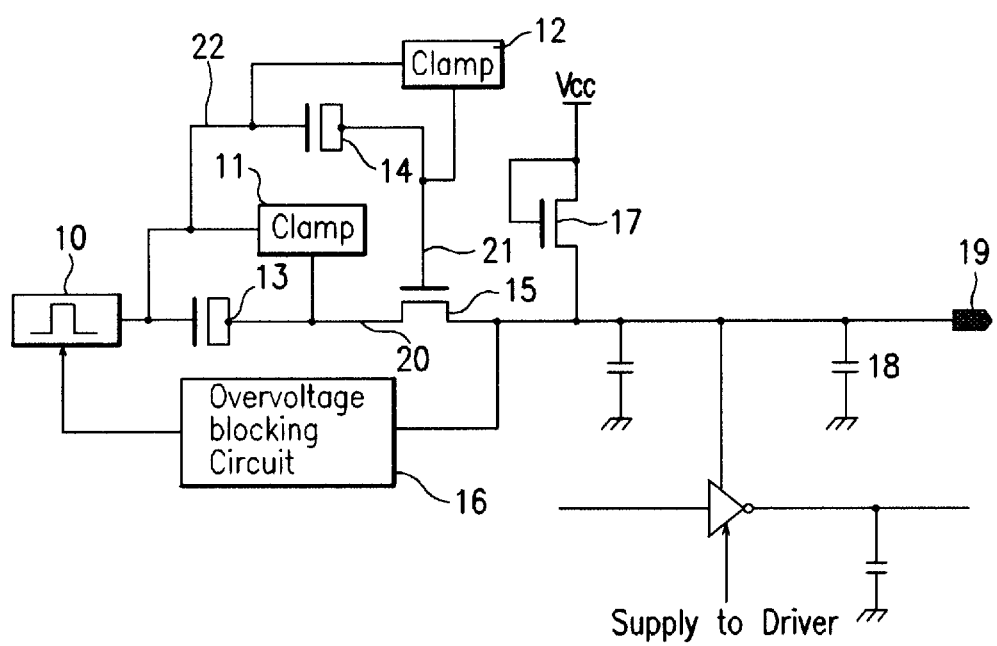
FIG. 1 is a circuit diagram of a conventional charge pumping circuit.
Figure 2:
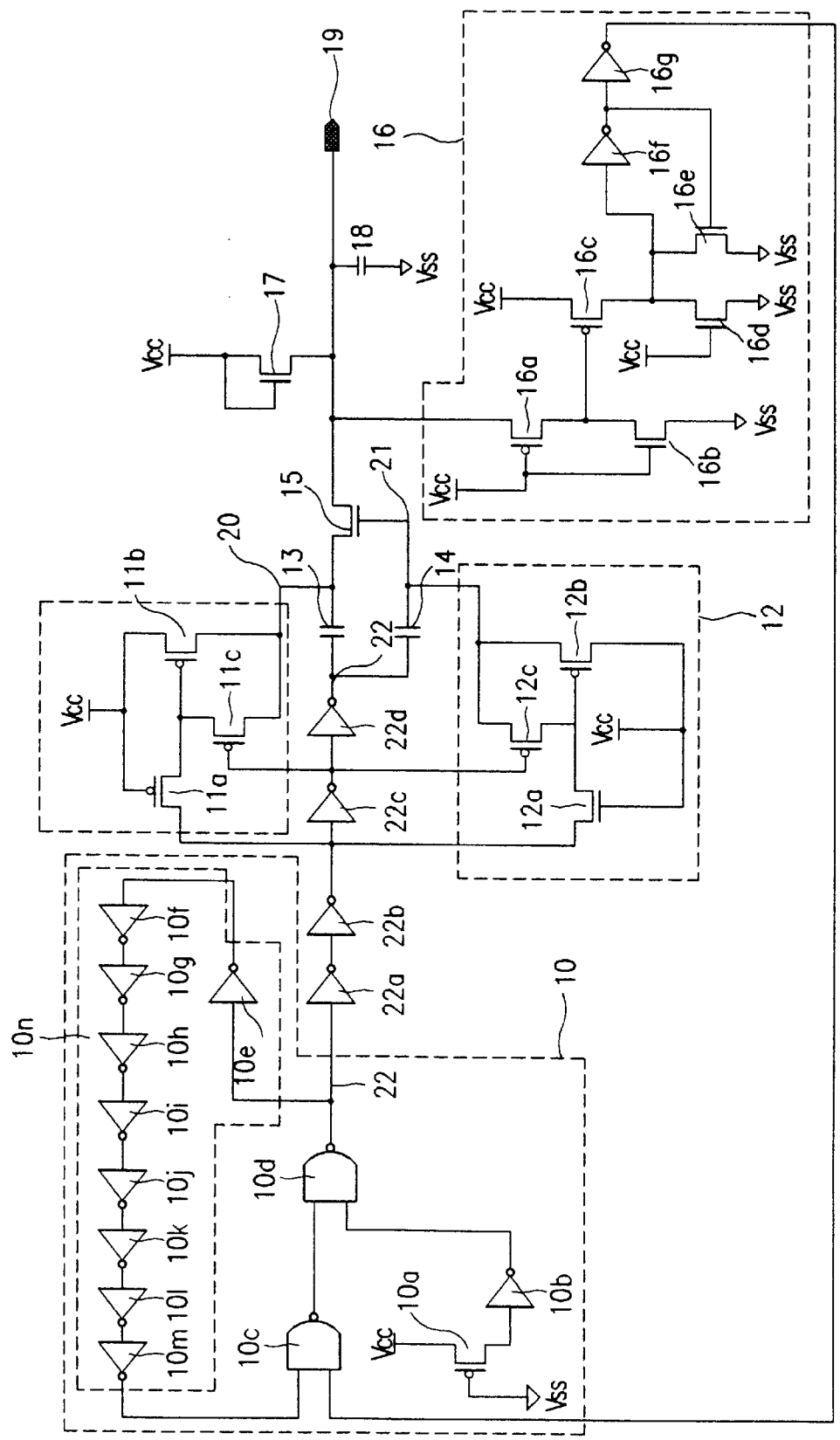
FIG. 2 is a detailed circuit digram of FIG. 1.
Figure 3:
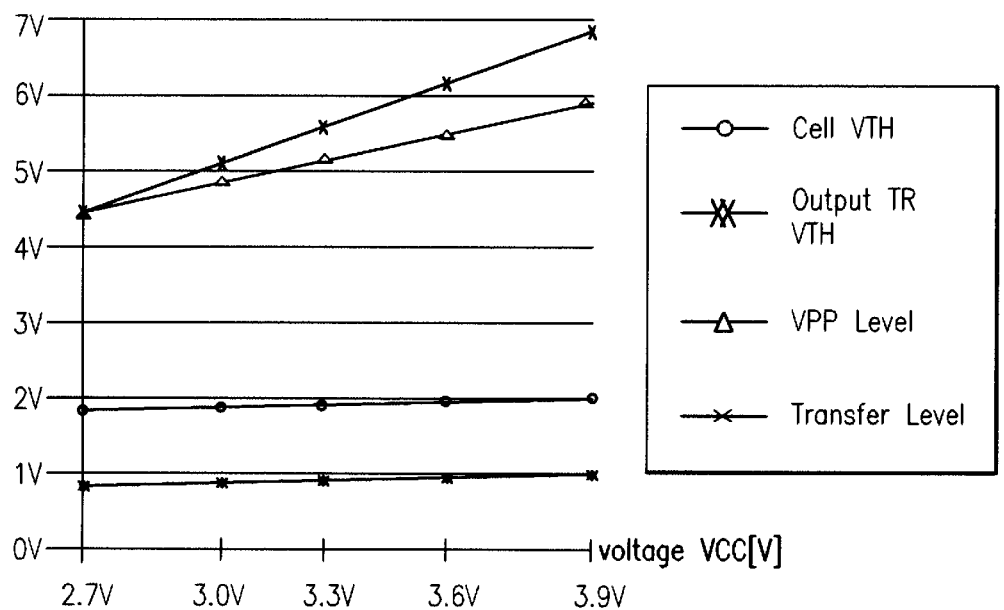
FIG. 3 depicts variations of threshold voltages of a conventional cell and output-transistor according to a Vcc voltage variation.
Figure 4:
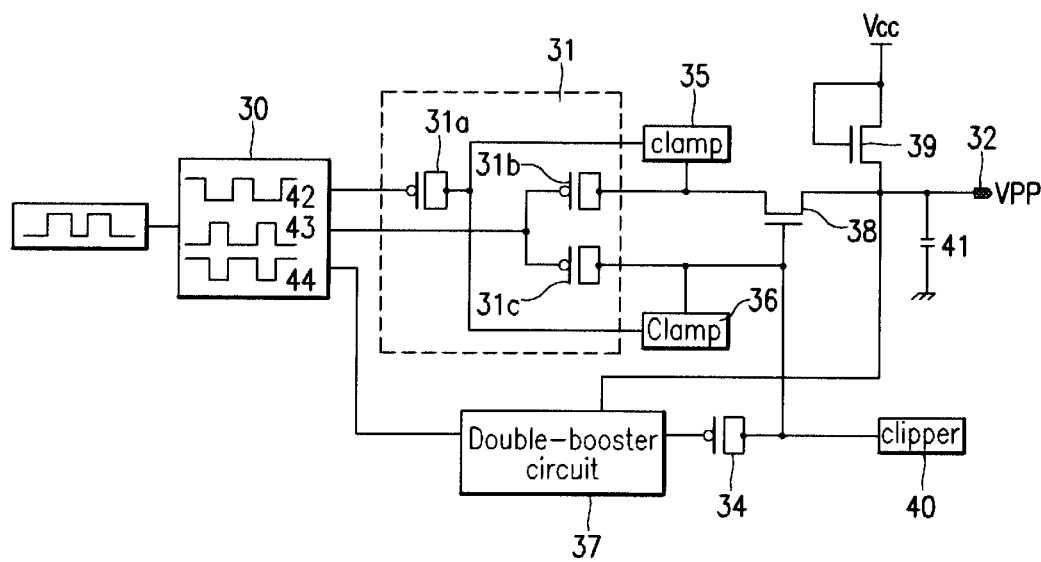
FIG. 4 is a circuit diagram of a high-efficiency charge pumping circuit of the present invention.

As illustrated in FIG. 4, the high-efficiency charge pumping circuit includes: an oscillator 30 for generating a predetermined pulse voltage cycle; a first booster capacitor unit 31 composed of a plurality of booster capacitors 31a, 31b, and 31c for storing a HIGH level output signal of the oscillator 10; a first clamp unit 35 for maintaining the output signal of the booster capacitors 31a and 31b of the first booster capacitor unit 31 at a predetermined level; a second clamp unit 36 for maintaining the outputs of the booster capacitor 31c of the first booster capacitors unit 31a and at a predetermined level; a double-booster circuit 37 for double-boosting the output signal of the oscillator 30, and then outputting the double-boosted output; a second booster capacitor unit 34 for temporarily storing the output voltage of the double-boosting circuit 37 and then outputting the stored voltage to the second clamp unit 36; a first transistor 38 for receiving a voltage greater than a predetermined level at its gate terminal according to the double-boosting of the double-booster circuit 37, and for completely outputting the drain voltage input from the first clamp unit 35; a second transistor 39 for receiving an internal Vcc voltage when the system is turned on, and for outputting a pumped voltage Vpp to an output node 32; a clipper 40 for preventing the first transistor from being broken down when the gate voltage of the first transistor 38 is above a predetermined voltage; and a storage capacitor 41 for temporarily storing the voltage of the second transistor 39.

Figure 5:
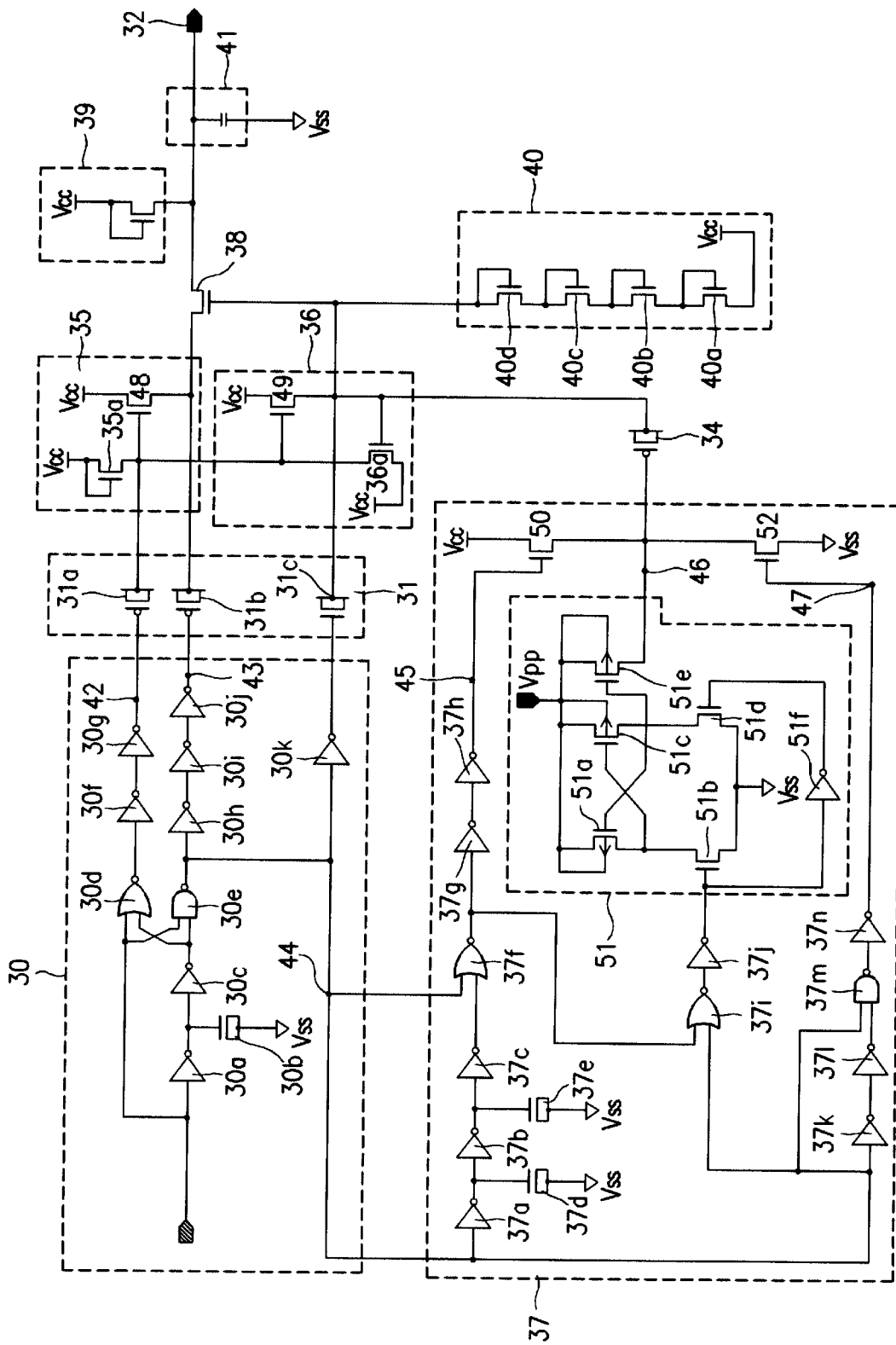
FIG. 5 is a detailed circuit diagram of FIG. 4.

The operation of the high-efficiency charge pumping circuit of the present invention will be described below with reference to FIG. 5.

The oscillator 30 includes an inverter 30a for inverting an input signal; a capacitor 30b connected to the inverter 30a for thereby storing the inverted signal of 30a at HIGH level, and for outputting the stored signal at a LOW level; an inverter 30c for inverting the input signal and the output signal of the capacitor 30b; a NOR gate 30d and NAND gate 30e for receiving input and output signals of the inverter 30c, for performing their respective logic functions, and for then outputting the resulting logic signal; inverters 30f and 30g for sequentially inverting the signal output from the NOR gate 30d two times; inverters 30h, 30i, 30j for sequentially inverting the signal output from the NAND gate 30e three times; and an inverter 30k for inverting the signal output from the NAND gate 30e.

The first clamp unit 35 includes: an NMOS transistor 35a turned on/off when the Vcc signal is input to its gate and source terminals; and an NMOS transistor 48 turned on/off when the output of the booster capacitor 31b of the first booster capacitor unit 31 is input to its gate terminal, and the Vcc signal is input to its source terminal.

The second clamp unit 36 includes: an NMOS transistor 49 turned on/off when an output of the NMOS transistor 35a of the first clamp unit 35 is input to its gate terminal, and the Vcc signal is input to its source terminal; and an NMOS transistor 36a turned on/off when the output of the NMOS transistor 49 is input to its gate terminal.

The double-booster circuit 37 includes: an inverter 37a for inverting the output signal 44 of the NAND gate 30e of the oscillator 30 and then outputting the inverted signal; a capacitor 37d connected in parallel to the inverter 37a, thereby storing the inverted signal of 37a at a HIGH level, and outputting the stored signal at a LOW level; an inverter 37b for inverting the output signals of the inverter 37a and the capacitor 37d; a capacitor 37e for storing the output signal of the inverter 37b at a HIGH level, and outputting the stored signal at a LOW level; an inverter 37c for inverting the output signals of the inverter 37b and the capacitor 37e; NOR gate 37f for performing a NOR logic function with the output signal of the inverter 37c and the output signal 44 of the NAND gate 30e of the oscillator 30; inverters 37g and 37h connected in series for thereby sequentially inverting the signal output from the NOR gate 37f two times; and an NMOS transistor 50 having a gate terminal receiving the output signal 45 of the inverter 37h and a source terminal connected to Vcc, thereby being turned on/off.

The double-booster circuit 37 also includes a NOR gate 37i for performing a NOR logic function with the output signal of the inverter 37f and the output signal 44 of the NAND gate 30e of the oscillator 30; an inverter 37j for inverting the output signal of the NOR gate 37i; inverters 37k and 37l connected in series, thereby sequentially inverting the signal 44 output from the NAND gate 30e of the oscillator 30 two times; NAND gate 37m for performing a NAND logic function with the output signal of the inverter 37l and the output signal 44 of the NAND gate 30e of the oscillator 30; an inverter 37n for inverting the output signal of the NAND gate 37m and then outputting the inverted signal; a transistor 52 having a gate terminal receiving the signal 47 output from the inverter 37n and a source terminal connected to Vss, thereby being turned on/off; and a level shifter 51 composed of a plurality of PMOS FETs 51a, 51c, 51e, NMOS transistors 51b and 51d, and inverter 51f, for increasing the voltage to Vpp, and outputting the increased voltage to the second booster capacitor 34 through a common terminal of the NMOS transistors 50 and 52.

In the level shifter 51, the signal output from the inverter 37j is applied to the gate terminal of the NMOS transistor 51b, simultaneously inverted by the inverter 51f, and applied to the gate terminal of the NMOS transistor 51d.

The source terminals of the NMOS transistors 51b and 51d are commonly connected to a ground voltage Vss.

The drain terminals of the PMOS FET 51a and the NMOS transistor 51d are connected with each other, and the drain terminal of the NMOS transistor 51b is connected to the gate terminal of the PMOS FET 51c.

The drain terminals of the PMOS FET 51c and NMOS transistor 51d are connected with each other, and the gate terminal of the PMOS FET 51a is connected to the gate terminal of the PMOS FET 51e.

The clipper 40 is composed of a plurality of NMOS transistors 40b, 40c, 40d connected in series to the drain terminal of the NMOS transistor 40a, in which a Vcc voltage is applied to the source terminal of the NMOS transistor 40a.

An operation of the high-efficiency charge pumping circuit of the present invention will be described below with reference to FIG. 5.

When voltage Vcc is applied to the second transistor 39 to thereby reach a predetermined voltage until the system is turned on, the voltage level of the output node 32 equals Vcc minus the threshold voltage Vth of the second transistor 39.

When the system is turned on, the voltage reaches a predetermined level, and the application of the Vcc voltage is completed so that the voltage level of the output node 32 is lower than the state (Vcc−Vth), the second transistor 39 is turned on to maintain the state (Vcc−Vth). Here, the signals (node 42, node 43) output from the oscillator 30 which generate the predetermined pulses are non-overlapped with each other, and the signal (node 44) is the inverted signal of the node 43.

When the node 42 is at a HIGH level, the voltage of the other side of the booster capacitor 31a in the first booster capacitor unit 31 increases above Vcc, thereby turning on the NMOS transistors 48 and 49 of the first and second clamp units 35 and 36.

The NMOS transistor 48 applies Vcc to the drain terminal of the output transistor 38, and the NMOS transistor 49 applies the Vcc voltage of the gate terminal of the output transistor 38.

Thereafter, the node 43 increases to a HIGH level, the booster capacitor 31a of the first booster capacitor units 31 increases the drain voltage of the output transistor 38 to 2 Vcc to maintain the voltage (Vcc−Vth), and simultaneously the booster capacitor 31c is booster, thereby increasing the gate voltage of the output transistor 38 to 2 Vcc.

When the booster capacitor 31c of the first booster capacitor unit 31 is boosted, the double-booster circuit divides pulses of the node 44, and therefore increases the node 45 to a HIGH level, thereby turning the NMOS transistor 50.

The voltage via the NMOS transistor 50 increases the node 46 to the state (Vcc−Vth). Then, when the level shifter 51 is operated so that the voltage level of the node 46 is double-boosted in the direction of the output node 32, the gate voltage of the output transistor 38 is increased to 2 Vcc.

When the node 43 is at a LOW level, the node 47 is at a HIGH level, thereby turning on the NMOS transistor 52 to lower the node 46 to a LOW level.

That is, as the gate voltage of the output transistor 38 is increased above the threshold voltage Vcc+Vth by the double-booster circuit 37, the drain voltage 2 Vcc of the output transistor 38 is completely transferred to the storage capacitor 41.

Here, the clipper 40 prevents the output transistor from being broken down due to the excessively high voltage of the gate terminal of the output transistor.

Accordingly, even though the pumping efficiency at the output node 32 is in the worst condition (Vcc=2.7 V), its voltage level can be sufficiently increased to a desired level.

As described above, the present invention can increase the gate voltage of the output transistor above 2 Vcc+Vth, and completely transmit the drain voltage 2 Vcc of the output transistor to the storage capacitor in order to reduce a consumption of stored charge, thereby increasing the charge pumping efficiency.

It will be apparent to those skilled in the art that various modifications and variations can be made in the high-efficiency charge pumping circuit of the present invention without departing from the spirit or scope of the invention. Thus, it is intended that the present invention cover the modifications and variation of this invention provided they come within the scope of the appended claims and their equivalents.

What is claimed is:

1. A high-efficiency charge pumping circuit comprising:

an oscillator for generating a predetermined cycle of pulse voltage and having at least a first oscillator output voltage, a second oscillator output voltage, a third oscillator output voltage and a fourth oscillator output voltage corresponding to the third oscillator output voltage;

a first booster capacitor unit for storing the first oscillator output voltage, the second oscillator output voltage, and the fourth oscillator output voltage at a first level, and outputting a first booster capacitor output voltage, a second booster capacitor output voltage, and a third booster capacitor output voltage after storage when the first oscillator output voltage, the second oscillator output voltage, and the fourth oscillator output voltage are at a second level;

a first clamp unit for maintaining the first booster capacitor output voltage and the second booster capacitor output voltage at corresponding predetermined levels;

a second clamp unit for maintaining the first booster capacitor output voltage and the third booster capacitor output voltage at corresponding predetermined levels;

a second booster capacitor unit;

a booster circuit coupled to the second booster capacitor unit for boosting the third oscillator output voltage and then outputting a boosted output signal as an output of the booster circuit inputted to the second booster capacitor unit;

a first transistor for receiving a voltage greater than the third oscillator output voltage from the second booster capacitor unit, and for outputting a first transistor output voltage inputted from the first clamp unit;

a second transistor coupled to the first transistor and receiving an internal voltage, the second transistor outputting a second transistor output voltage;

a clipper connected to a gate of the first transistor and to the second clamp unit, the clipper capable of preventing a breakdown of the first transistor; and a storage capacitor for temporarily storing the second transistor output voltage.

2. The high-efficiency charge pumping circuit as claimed in claim 1, wherein the oscillator comprises:

a first inverter for inverting an input signal;

a capacitor connected to the first inverter for storing the inverted signal from the first inverter at a HIGH level, and for outputting the stored and inverted signal at a LOW level;

a second inverter for inverting the output signal of the first inverter and the capacitor;

a NOR gate and a NAND gate each for receiving an output of the second inverter and an input of the first inverter, performing a logic function with the received signals, and then outputting a resulting logic signal;

third and fourth inverters for sequentially twice inverting the logic signal output from the NOR gate;

fifth, sixth and seventh inverters for sequentially thrice inverting the logic signal output from the NAND gate; and an eighth inverter for inverting a signal output from the NAND gate.

3. The high-efficiency charge pumping circuit as claimed in claim 2, wherein the first booster capacitor unit comprises:

a first booster capacitor for storing an output of the fourth inverter of the oscillator, and then outputting the stored output of the fourth inverter;

a second booster capacitor for storing an output of the seventh inverter of the oscillator and then outputting the stored output of the seventh inverter; and a third booster capacitor for storing an output of the eighth inverter of the oscillator and then outputting the stored output of the eighth inverter.

4. The high-efficiency charge pumping circuit as claimed in claim 3, wherein the first clamp unit comprises:

a first NMOS transistor turned on/off when a Vcc signal is input to source and gate terminals of the first NMOS transistor; and a second NMOS transistor turned on/off when an output of the first booster capacitor of the first booster capacitor unit is input to a gate of the second NMOS transistor, and the Vcc signal is input to a source of the second NMOS transistor.

5. The high-efficiency charge pumping circuit at claimed in claim 4, wherein the second clamp unit comprises:

a first NMOS transistor turned on/off when an output of an NMOS transistor of the first clamp unit is input to a gate terminal of the first NMOS transistor of the second clamp unit and the Vcc signal is input to a source terminal of the first NMOS transistor of the second clamp unit; and a second NMOS transistor turned on/off when an output of the first NMOS transistor of the second clamp circuit is inputted to a gate of the second NMOS transistor of the second clamp unit, the NMOS transistor of the first clamp unit providing an output to the first NMOS transistor of the second clamp unit.

6. The high-efficiency charge pumping circuit as claimed in claim 5, wherein the booster circuit comprises:

a first inverter for inverting an output signal from a NAND gate of the oscillator;

a first capacitor connected to the first inverter of the booster circuit for storing the inverted signal from the first inverter of the booster circuit at a HIGH level, and for outputting the signal stored by the first capacitor at a LOW level;

a second inverter for inverting output signals of the first inverter and first capacitor of the booster circuit;

a second capacitor for storing an output signal of the second inverter of the booster circuit at a HIGH level, and for outputting the signal stored by the second capacitor at a LOW level;

a third inverter for inverting output signals of the second inverter and second capacitor of the booster circuit;

a first NOR gate for performing a NOR logic function with an output signal of the third inverter of the double-booster circuit and the output signal from the NAND gate of the oscillator;

fourth and fifth inverters for sequentially twice inverting an output signal of the first NOR gate;

a first NMOS transistor turned on/off when an output signal of the fifth inverter of the booster circuit is input to a gate terminal of the first NMOS transistor, the first NMOS transistor of the booster circuit having a source terminal connected to a source voltage Vcc;

a second NOR gate for performing a NOR logic function with the output signal from the NAND gate of the oscillator and the first NOR gate of the booster circuit, and for outputting a resulting logic signal;

a sixth inverter for inverting an output signal of the second NOR gate of the booster circuit;

seventh and eighth inverters connected in series for sequentially twice inverting the output signal from the NAND gate of the oscillator;

a NAND gate for performing a NAND logic function with an output signal of the eighth inverter of the booster circuit and the output signal from the NAND gate of the oscillator;

a ninth inverter for inverting and then outputting an output signal of the NAND gate of the booster circuit;

a second NMOS transistor having a source terminal connected to a ground voltage Vss and being turned on/off when an output of the ninth inverter of the booster circuit is input to a gate terminal of the transistor; and a level shifter for increasing a signal with respect to the source voltage Vcc and for outputting an increased signal to the second boost capacitor unit through a common terminal of the first and second NMOS transistors of the booster circuit.

7. The high-efficiency charge pumping circuit as claimed in claim 6, wherein the level shifter comprises:

a first NMOS transistor having a source terminal connected to a Vss terminal and a gate terminal to which a signal output from the sixth inverter of the booster circuit is input;

a second NMOS transistor having a source terminal connected to a Vss terminal and a gate terminal to which a signal inverted by the sixth inverter of the booster circuit is input;

a first PMOS FET having a drain terminal connected to a drain terminal of the first NMOS transistor of the level shifter;

a second PMOS FET having a gate terminal connected to the drain terminal of the first NMOS transistor of the level shifter, and a drain terminal connected to the drain terminal of the second NMOS transistor of the level shifter; and a third PMOS FET having a gate terminal connected to a gate terminal of the first PMOS FET of the level shifter.

8. A high-efficiency charge pumping circuit comprising:

an oscillator for generating first, second and third oscillator outputs comprising a predetermined cycle of pulses;

a booster circuit having a booster capacitor for substantially doubling the first oscillator output in order to provide a booster circuit output;

a first transistor for receiving a voltage greater than the third oscillator output and based on the booster circuit output such that the first transistor completely outputs a pumping voltage received by the first transistor;

a first capacitor for storing the first oscillator output and outputting a first capacitor output;

a second capacitor for storing the second oscillator output and outputting a second capacitor output to the first transistor;

a third capacitor for storing the third oscillator output and outputting a third capacitor output;

a first clamp unit for maintaining the second capacitor output at a first predetermined level;

a storage capacitor coupled to the first transistor for temporarily storing the pumping voltage; and a clipper connected to a gate of the first transistor, wherein the clipper prevents a breakdown of the first transistor due to excessively high voltage on a gate of the first transistor.

9. The high-frequency charge pumping circuit as claimed in claim 8, further including:

a second clamp unit for maintaining the second capacitor output at a second predetermined level.

10. The high-frequency charge pumping circuit as claimed in claim 8, wherein the booster capacitor temporarily stores and then outputs an output voltage of the booster circuit.

11. The high frequency charge pumping circuit as claimed in claim 8, further including:

a second transistor coupled to at least the first transistor and the storage capacitor.

* * * * *